US009590275B2

United States Patent
Lee et al.

(10) Patent No.: US 9,590,275 B2
(45) Date of Patent: Mar. 7, 2017

(54) ELECTROLYTE FOR LITHIUM BATTERY AND LITHIUM BATTERY INCLUDING THE SAME

(71) Applicant: SAMSUNG SDI CO., LTD., Yongin-si, Gyeonggi-do (KR)

(72) Inventors: Seungtae Lee, Yongin-si (KR); Myunghoon Kim, Yongin-si (KR); Taehyun Bae, Yongin-si (KR); Aeran Kim, Yongin-si (KR); Woocheol Shin, Yongin-si (KR); Soojin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 82 days.

(21) Appl. No.: 14/730,103

(22) Filed: Jun. 3, 2015

(65) Prior Publication Data
US 2016/0056504 A1 Feb. 25, 2016

(30) Foreign Application Priority Data
Aug. 25, 2014 (KR) .................. 10-2014-0111045

(51) Int. Cl.
*H01M 10/0569* (2010.01)
*H01M 10/0567* (2010.01)
*H01M 10/0525* (2010.01)
*H01M 10/052* (2010.01)

(52) U.S. Cl.
CPC ... *H01M 10/0567* (2013.01); *H01M 10/0525* (2013.01); *H01M 10/052* (2013.01); *H01M 2300/0025* (2013.01)

(58) Field of Classification Search
CPC .................. H01M 10/0567; H01M 10/0569
See application file for complete search history.

(56) References Cited

U.S. PATENT DOCUMENTS

| | | | |
|---|---|---|---|
| 2009/0286157 A1 | 11/2009 | Chen et al. | |
| 2009/0305145 A1 | 12/2009 | Kim et al. | |
| 2010/0209772 A1 | 8/2010 | Lee et al. | |
| 2010/0248039 A1* | 9/2010 | Oh | H01M 10/0525 429/338 |
| 2011/0136006 A1* | 6/2011 | Nogi | H01M 6/162 429/200 |
| 2012/0301760 A1 | 11/2012 | Murai | |

FOREIGN PATENT DOCUMENTS

| | | |
|---|---|---|
| JP | 2004-342607 A | 12/2004 |
| JP | 2006-216378 A | 8/2006 |

(Continued)

OTHER PUBLICATIONS

English machine translation of Japanese Publication No. JP 2004-342607 A, dated Dec. 2, 2004, 43 pages.

(Continued)

*Primary Examiner* — Stewart Fraser
*Assistant Examiner* — Olatunji Godo
(74) *Attorney, Agent, or Firm* — Lewis Roca Rothgerber Christie LLP

(57) ABSTRACT

An electrolyte for a lithium battery and a lithium battery including the electrolyte. The electrolyte is employed in the lithium battery so as to improve cycle characteristics of the lithium battery that is operable at high voltages.

11 Claims, 6 Drawing Sheets

(56) References Cited

FOREIGN PATENT DOCUMENTS

| KR | 10-2010-0093321 A | 8/2010 |
| KR | 10-2013-0120617 A | 11/2013 |
| KR | 10-2013-0142387 A | 12/2013 |

OTHER PUBLICATIONS

Zhu, Ye et al., "Positive Electrode Passivation by LiDFOB Electrolyte Additive in High-Capacity Lithium-Ion Cells", Journal of the Electrochemical Society, Oct. 20, 2012, pp. A2109-A2117, vol. 159.
EPO Search Report dated Jan. 15, 2016, for corresponding European Patent application 15179860.0, (8 pages).

* cited by examiner

ELECTROLYTE FOR LITHIUM BATTERY AND LITHIUM BATTERY INCLUDING THE SAME

CROSS-REFERENCE TO RELATED APPLICATION

This application claims priority to and the benefit of Korean Patent Application No. 10-2014-0111045, filed on Aug. 25, 2014, in the Korean Intellectual Property Office, the disclosure of which is incorporated herein in its entirety by reference.

BACKGROUND

1. Field

One or more example embodiments relate to an electrolyte for a lithium battery and a lithium battery including the electrode.

2. Description of the Related Art

Lithium secondary batteries that are used (utilized) in portable electronic devices (including PDA, mobile phones, and laptops) for information and communication, or in electric bicycles or electric vehicles have discharge voltages that are at least twice as large as that of conventional batteries. Accordingly, lithium secondary batteries may have high energy density.

A lithium secondary battery includes a cathode and an anode, each includes an active material capable of intercalation and deintercalation of lithium ions, and an organic electrolytic or a polymer electrolyte that is filled between the cathode and the anode. Here, oxidation and reduction reactions occur during intercalation/deintercalation of lithium ions in the cathode and the anode, thereby generating electric energy.

With the expanding use (usage) of lithium secondary batteries in the electric vehicles and power storage fields, electrode active materials for use (usage) at high voltages have become available. Use (usage) of a relatively low-potential anode active material and a relatively high-potential cathode active material has led to a narrower potential window of the electrolyte, so that the electrolyte becomes more likely to decompose on a surface of the cathode/anode. In addition, lithium secondary batteries for electric vehicles and power storage are likely to be exposed to external high-temperature environment conditions, and the temperatures of these lithium secondary batteries may rise during instantaneous charging and discharging. Accordingly, lifetime (lifespan) and stored energy quantity of the lithium secondary battery may be reduced in such high-temperature environment conditions.

Therefore, stability and cycle characteristics of the lithium battery at high voltages are important concerns for application of the lithium battery in the electric vehicle fields or the like.

SUMMARY

An aspect according to one or more example embodiments is directed toward an electrolyte for a lithium battery, the electrolyte helping to improve cycle characteristics of a lithium battery at high voltages.

An aspect according to one or more example embodiments is directed toward a lithium battery including the electrolyte.

Additional aspects will be set forth in part in the description which follows and, in part, will be apparent from the description, or may be learned by practice of the presented embodiments.

According to one or more example embodiments, an electrolyte for a lithium battery includes: a non-aqueous organic solvent; a first compound represented by Formula 1; and a second compound represented by Formula 2:

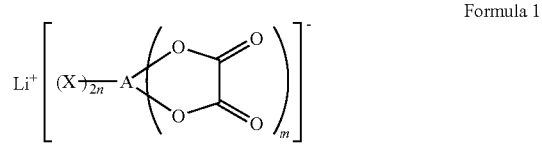

Formula 1

In Formula 1,

A is boron (B) or phosphorus (P);

X is a halogen atom;

in the case that A is boron (B), n equals 1 and m equals 1; and in the case that A is phosphorus (P), n equals 1 and m equals 2, or n equals 2 and m equals 1.

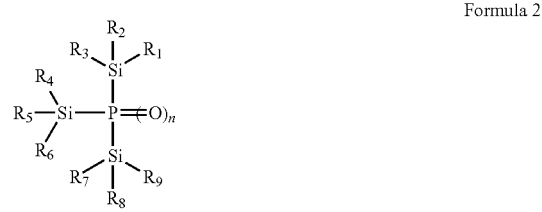

Formula 2

In Formula 2, $R_1$ to $R_9$ may be each independently selected from a hydrogen, a deuterium, a halogen atom, a hydroxyl group (—OH), a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a thio group (—SH), —C(=O)—H, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, and a substituted or unsubstituted $C_2$-$C_{60}$ heteroaryl group; and n is 0 or 1.

According to one or more example embodiments, a lithium battery includes the electrolyte.

BRIEF DESCRIPTION OF THE DRAWINGS

These and/or other aspects will become apparent and more readily appreciated from the following description of the example embodiments, taken in conjunction with the accompanying drawings in which:

FIGS. 4A and 4B are graphs of intensity versus binding energy illustrating X-ray photoelectron spectra (XPS) data of surface materials from the cathodes of the lithium batteries prepared according to Example 2 and Comparative Examples 2A-2B after the initial charging and discharging cycle, in which FIG. 4A shows data measured at O 1 s peaks and FIG. 4B shows data measured at F 1 s peaks.

DETAILED DESCRIPTION

Figure 1:
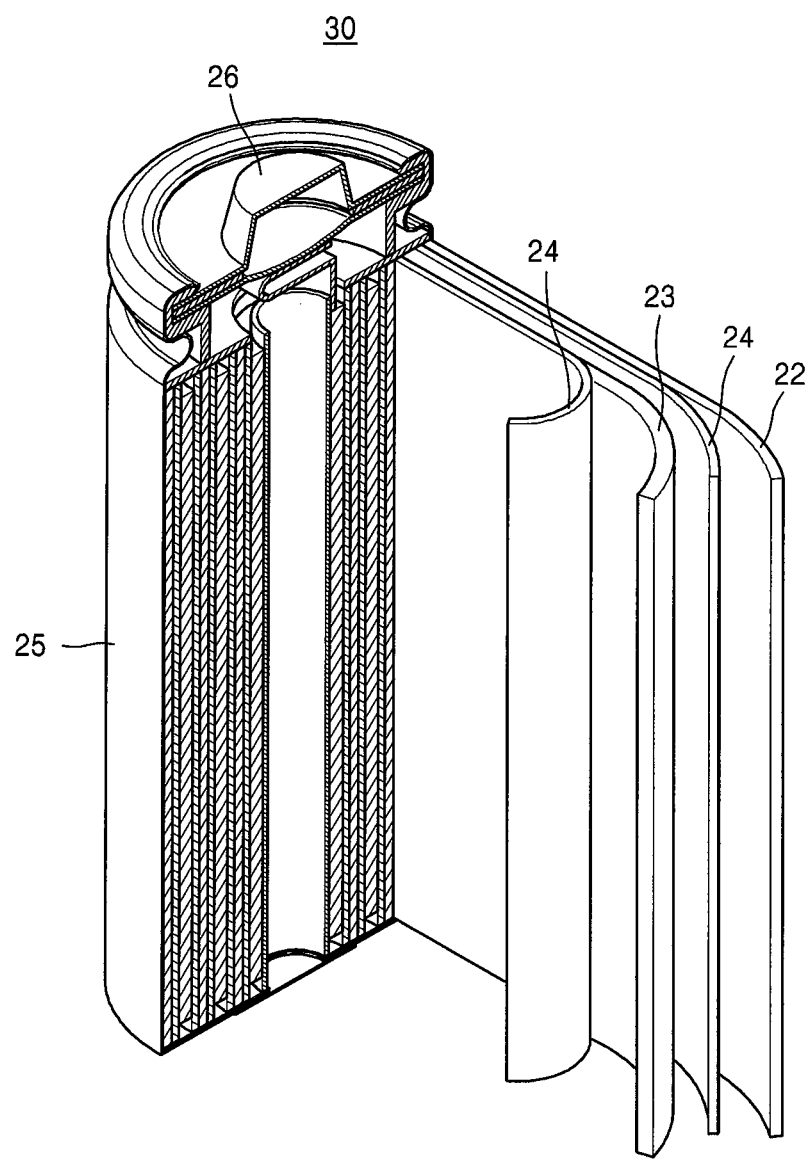
FIG. 1 is a schematic cross-sectional view illustrating a structure of a lithium battery according to an example embodiment.

Reference will now be made in more detail to example embodiments of an electrolyte for a lithium battery and a lithium battery employing the electrolyte, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Expressions such as "at least one of" when preceding a list of elements, modify the entire list of elements and do not modify the individual elements of the list. Further, the use of "may" when describing embodiments of the present invention refers to "one or more embodiments of the present invention." As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §1 12, first paragraph, and 35 U.S.C. §132(a).

According to an embodiment, an electrolyte for a lithium battery includes: a non-aqueous organic solvent; a first compound represented by Formula 1 below; and a second compound represented by Formula 2 below:

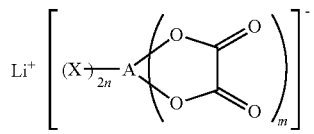

Formula 1

In Formula 1 above,

A may be boron (B) or phosphorus (P),

X may be a halogen atom, in the case that A is boron (B), n may equal 1 and m may equal 1, and in the case that A is phosphorus (P), n may equal 1 and m may equal 2, or n may equal 2 and m may equal 1.

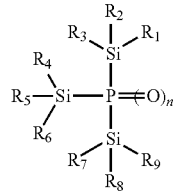

Formula 2

In Formula 2 above, $R_1$ to $R_9$ may be each independently selected from a hydrogen, a deuterium, a halogen, a hydroxyl group (—OH), a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a thio group (—SH), —C(=O)—H, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, and a substituted or unsubstituted $C_2$-$C_{60}$ heteroaryl group, and n is 0 or 1.

A lithium battery, e.g., a lithium secondary battery, may deteriorate during the charging and discharging cycles and cause decomposition of an electrolyte on a surface of a cathode and/or an anode. The electrolyte decomposition occurring on a surface of a cathode during the charge may include two kinds of reactions: one is decomposition of a non-aqueous organic solvent, and the other is decomposition of a lithium salt as a solute. These decomposition reactions may cause not only a change in the electrolyte composition, but also a decrease in the charging and discharging efficiency. Furthermore, decomposition products obtained herein may form an inert film on a surface of a cathode and/or an anode, and inhibit the charging and discharging reactions of the battery. In this regard, cycle characteristics thereof may be degraded.

In the case of using (utilizing) a combination of the first compound and the second compound as electrolyte additives, the first compound may form a strong, LiF-based protective film having an oxalate structure by oxidation. In this regard, the first compound may implement stable performance of the battery good enough to reduce or prevent a solvent from being oxidized/decomposed and metal ions from being eluted, at high voltages of at least 4.4 V. In addition, the second compound may form a strong coordination (e.g., coordination-type) film on an active material to exhibit effects of forming a stronger film at the same time. Thus, the formation of the cathode film may suppress the deterioration of the battery upon decomposition of the electrolyte. In addition, the second compound may also suppress decomposition of lithium salts, and accordingly, may reduce side effects and suppress gas generation at the same time, thereby helping to improve the stability of the battery.

Definitions of substituents used herein will be described as follows.

The term "alkyl" group used herein refers to a group derived from a completely saturated, branched or unbranched (or a straight or linear) hydrocarbon.

Non-limiting examples of the "alky" group include methyl, ethyl, n-propyl, isopropyl, n-butyl, isobutyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a $C_1$-$C_{20}$ alkyl group substituted with a halogen atom (e.g., $CCF_3$, $CHCF_2$, $CH_2F$, and $CCl_3$), a $C_1$-$C_{20}$ alkoxy group, a $C_2$-$C_{20}$ alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_6$-$C_{20}$ heteroaryloxy group, a $C_6$-$C_{20}$ heteroaryloxy alkyl group, and/or a $C_6$-$C_{20}$ heteroarylalkyl group.

The term "halogen atom" used herein refers to fluorine, bromine, chlorine, and/or iodine.

The term "$C_1$-$C_{20}$ alkyl group substituted with a halogen atom" used herein refers to a $C_1$-$C_{20}$ alkyl group substituted with at least one halogen group; and non-limiting examples thereof include a monohaloalkyl group, a dihaloalkyl group, and a polyhaloalkyl group including a perhaloalkyl group.

The monohaloalkyl group may refer to an alkyl group including iodine, bromine, chlorine, or fluorine. The dihaloalkyl group and the polyhaloalkyl group may refer to an alkyl group having two or more halogen atoms that are the same or different from each other.

The term "alkoxy" group used herein may be represented by alkyl-O—, wherein the term "alkyl" has the same meaning as described above. Non-limiting examples of the alkoxy group include methoxy, ethoxy, propoxy, 2-propoxy, butoxy, tert-butoxy, pentyloxy, hexyloxy, cyclopropoxy, and cyclohexyloxy. At least one hydrogen atom of the alkoxy group may be substituted with the same substituents as used in the alkyl group described above.

The term "alkoxyalkyl" group used herein refers to an alkyl group substituted with the alkoxy group. At least one hydrogen atom of the alkoxyalkyl group may be substituted with the same substituents as used in the alkyl group. Likewise, the term "substituted alkoxyalkyl" used herein refers to a substituted alkoxyalkyl moiety.

The term "alkenyl" group used herein refers to a group derived from a branched or unbranched hydrocarbon with at least one carbon-carbon double bond. Non-limiting examples of the alkenyl group include vinyl, aryl, butenyl, isoprophenyl, and isobutenyl. At least one hydrogen atom of the alkenyl group may be substituted with the same substituents as used in the alkyl group described above.

The term "alkynyl" group used herein refers to a group derived from a branched or unbranched hydrocarbon with at least one carbon-carbon triple bonds. Non-limiting examples of the alkynyl group include ethnyl, butynyl, iso-butynyl, and iso-propynyl.

At least one hydrogen atom of the "alkynyl group" may be substituted with the same substituents as used in the alkyl group described above.

The term "aryl" group used herein, which is used alone or in combination, refers to an aromatic hydrocarbon containing at least one ring.

The term "aryl" group used herein is construed as including a group with an aromatic ring fused to at least one cycloalkyl ring.

Non-limiting examples of the "aryl" group are phenyl, naphthyl, and tetrahydronaphthyl.

At least one hydrogen atom of the "aryl" group may be substituted with the same substituents as used in the alkyl group described above.

The term "arylalkyl" group used herein refers to an alkyl group substituted with an aryl group. Examples of the arylalkyl group include benzyl and phenyl —$CH_2CH_2$—.

The term "aryloxy" group used herein may be represented by —O-aryl, and an example thereof is phenoxy. At least one hydrogen atom of the "aryloxy" group may be substituted with the same substituents as used in the alkyl group described above.

The term "heteroaryl group" refers to a monocyclic or bicyclic organic compound including at least one heteroatom selected from nitrogen (N), oxygen (O), phosphorous (P), and sulfur (S), wherein the rest of the cyclic atoms are all carbon atoms. The heteroaryl group may include, e.g., one to five heteroatoms, and in some embodiments, may include a five- to ten-membered ring. In the heteroaryl group, P, S or N may be present in various oxidized forms.

At least one hydrogen atom of the heteroaryl group may be substituted with the same substituents as used in the alkyl group described above.

The term "heteroarylalkyl" group used herein refers to an alkyl group substituted with a heteroaryl group.

The term "heteroaryloxy" group used herein refers to a —O-heteroaryl moiety. At least one hydrogen atom of the heteroaryloxy group may be substituted with the same substituents as used in the alkyl group described above.

The term "heteroaryloxyalkyl" group used herein refers to an alkyl group substituted with a heteroaryloxy group. At least one hydrogen atom of the heteroaryloxy group may be substituted with the same substituents as used in the alkyl group described above.

The term "carbon ring" refers to a saturated or a partially unsaturated, non-aromatic monocyclic, bicyclic, or tricyclic hydrocarbon.

Examples of the monocyclic hydrocarbon are a cyclopentyl, a cyclopentenyl, a cyclohexyl, and a cyclohexenyl. Examples of the bicyclic hydrocarbon are a bornyl, a decahydronaphthyl, a bicyclo[2.1.1]hexyl, a bicyclo[2.2.1]heptyl, a bicyclo[2.2.1]heptenyl, and a bicyclo[2.2.2]octyl.

An example of the tricyclic hydrocarbon is an adamantly.

At least one hydrogen atom of the "carbon ring" may be substituted with the same substituents as used in the alkyl group described above.

The term "hetero-ring group" used herein refers to a ring group consisting of 5-10 ring atoms including heteroatoms, such as N, S, P, or O. An example of the hetero-ring group is a pyridyl group. At least one hydrogen atom of the heteroring group may be substituted with the same substituents as used in the alkyl group described above.

The term "hetero-ring oxy group" used herein refers to —O-hetero-ring, and at least one hydrogen atom of the hetero ring oxy group may be substituted with the same substituents as used in the alkyl group described above.

The term "sulfonyl" used herein refers to R"—SO$_2$—, wherein R" may be a hydrogen, alkyl, aryl, heteroaryl, aryl-alkyl, heteroaryl-alkyl, heteroaryl-alkyl, alkoxy, aryloxy, cycloalkyl, or a hetero-ring group.

The term "sulfamonyl" group used herein refers to H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, and/or (heteroaryl-alkyl)-NHS(O$_2$)—.

At least one hydrogen atom of the sulfamonyl group may be substituted with the same substituents as used in the alkyl group described above.

The term "amino group" used herein refers to a case where a nitrogen atom is covalently bonded to at least one carbon or heteroatom. Examples of the amino group are —NH$_2$ and a substituted moiety. In addition, the amino group may include "alkylamino" in which a nitrogen atom is bonded to at least one additional alkyl group, "arylamino" in which a nitrogen atom is bonded to at least one aryl group, and "diarylamino" in which a nitrogen atom is bonded to at least two aryl groups, wherein the aryl group is independently selected.

According to an embodiment, in Formula 1, X may be a fluorine (F) atom.

The first compound may include at least one of lithium difluoro(oxalato)borate represented by Formula 1a below, lithium difluoro bis(oxalato)phosphate represented by Formula 1b below, and lithium tetrafluoro(oxalate)phosphate represented by Formula 1c below:

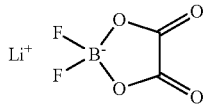

Formula 1a

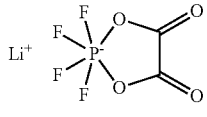

Formula 1b

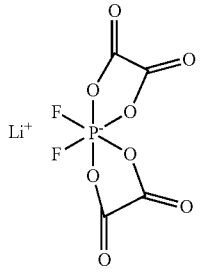

Formula 1c

The first compound may include a halogen component, such as a fluorine atom, as compared with lithium bis(oxalato)borate or lithium tris(oxalato)phosphate, and accordingly, the first compound may be able to form a strong film on a cathode and/or an anode by using (utilizing) LiF generated during the charge and discharge. In this regard, the first compound may contribute significantly (e.g., more effectively) to cyclic lifetime (lifespan) characteristics of the lithium battery.

The second compound of Formula 2 may include a phosphate or phosphite group, wherein R$_1$ to R$_9$ in Formula 2 are each independently a substituted or unsubstituted C$_1$ to C$_{10}$ alkyl group, such as a trialkylsylyl group.

For example, the second compound may include at least one of tris(trimethylsilyl)phosphine represented by Formula 2a below and tris(trimethylsilyl)phosphate represented by Formula 2b below:

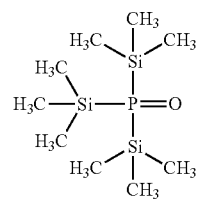

Formula 2a

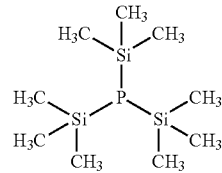

Formula 2b

In some embodiments, lithium difluoro(oxalato)borate of Formula 1a and tris(trimethylsilyl)phosphate of Formula 2a may be used (utilized) together as the first compound and the second compound, respectively.

An amount of the first compound may be not less than 0.1 wt % and not greater than 4 wt % based on a total weight of the electrolyte. For example, the amount of the first compound may be from about 0.1 wt % to about 3.5 wt %, in some embodiments, from about 1 wt % to about 3 wt %, based on the total weight of the electrolyte. When the amount of the first compound is within these ranges, the first compound may form a protective film with suitable film resistance, on the surface of a cathode of a lithium battery, thereby helping to improve cycle characteristics of the lithium battery.

An amount of the second compound may be not less than 0.1 wt % and not greater than 4 wt % based on a total weight of the electrolyte. For example, the amount of the second compound may be from about 0.1 wt % to about 3.5 wt %, in some embodiments, about 1 wt % to about 3 wt %, based on the total weight of the electrolyte. When the amount of the second compound is within these ranges, the second compound may maintain proper viscosity of the electrolyte and reduce or prevent side reactions from occurring in the cathode and/or anode.

In addition, based on a total weight of the electrolyte, a total amount of the first compound and the second compound may be less than about 6 wt %. When both compounds are mixed together and the total amount thereof is out of this range, solubility problems may be caused by excessive use (usage) of the compounds. In this regard, other side reactions may occur and accordingly, the cycle characteristics of the lithium battery may be degraded.

The non-aqueous organic solvent, which is in the electrolyte for the lithium battery according to the above-described embodiments, may serve as a migration medium of ions involved in electrochemical reactions of the battery.

The non-aqueous organic solvent may be a carbonate compound, an ester-based compound, an ether-based compound, a ketone-based compound, an alcohol-based compound, an aprotic solvent, or a combination thereof.

The carbonate compound may be a chain carbonate compound, a cyclic carbonate compound, a fluorocarbonate compound, or a combination thereof.

Examples of the chain carbonate compound are diethyl carbonat (DEC), dimethyl carbonate (DMC), dipropyl carbonate (DPC), methylpropyl carbonate (MPC), ethylpropylcarbonate (EPC), methylethyl carbonate (MEC), and a combination thereof. Examples of the cyclic carbonate compound are ethylene carbonate (EC), propylene carbonate (PC), butylene carbonate (BC), vinylethylene carbonate (VEC), and a combination thereof.

Examples of the fluorocarbonate compound are fluorethylene carbonate (FEC), 4,5-difluoroethylene carbonate, 4,4-difluoroethylene carbonate, 4,4,5-trifluoroethylene carbonate, 4,4,5,5-tetra fluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof.

The carbonate compound may include a combination (i.e., a mixture) of the chain carbonate compound and the cyclic carbonate compound. For example, when an amount of the cyclic carbonate compound is at least 20% by volume, e.g., 30% by volume or 40% by volume, based on a total volume of the non-aqueous organic solvent, cycle characteristics of a lithium battery may be significantly improved. That is, the cyclic carbonate compound may be contained in an amount from about 20% by volume to about 70% by volume, based on the total volume of the non-aqueous organic solvent.

The carbonate compound may be a mixture of the chain carbonate compound and/or the cyclic carbonate compound with the fluorocarbonate compound. The fluorocarbonate compound may increase the solubility of a lithium salt to improve ionic conductivity of the electrolyte, and may facilitate formation of the thin film on the anode. In some embodiments, the fluorocarbonate compound may be fluoroethylene carbonate (FEC).

An amount of the fluorocarbonate compound may be from about 1% by volume to about 30% by volume, based on a total volume of the non-aqueous organic solvent. In on embodiment, when the amount of the fluorocarbonate compound is within this range, the electrolyte has an appropriate viscosity to provide desired effects thereof. In some embodiments, the non-aqueous organic solvent may further include vinylethylene carbonate (VEC) in addition to fluoroethylene carbonate (FEC). Here, an amount of the vinylethylene carbonate (VEC) may be from about 0.1% by volume to about 10% by volume based on the total volume of the non-aqueous organic solvent.

Examples of the ester-based compound are methyl acetate, acetate, n-propyl acetate, dimethyl acetate, methyl propionate, ethyl propionate, γ-butyrolactone, decanolide, valerolactone, mevalonolactone, caprolactone, and methyl formate.

Examples of the ether-based compound are dibutyl ether, tetraglyme, diglyme, 1,2-dimethoxyethane, 1,2-diethoxyethane, ethoxymethoxyethane, 2-methyltetrahydrofuran, and tetrahydrofuran.

An example of the ketone compound is cyclohexanone.

Examples of the alcohol-based compound are ethyl alcohol and isopropyl alcohol.

Examples of the aprotic solvent are dimethylsulfoxide, 1,2-dioxolane, sulfolane, methylsolfulane, 1,3-dimethyl-2-imidazolidinone, N-methy-2-pyrrolidinone, formamide, dimethylformamide, acetonitrile, nitromethane, trimethyl phosphate, triethyl phosphate, trioctyl phosphate, and trimester phosphate.

The non-aqueous organic solvent may be used (utilized) alone or in a combination of at least two kinds of the non-aqueous organic solvents. In the latter, a mixing ratio of the at least two kinds of non-aqueous organic solvents may be appropriately adjusted depending on a desired performance of the battery.

The electrolyte for the lithium battery may further include a lithium salt.

The lithium salt may serve as a lithium ion source in the battery to enable normal (e.g., routine) operation of the lithium battery. The lithium salt may be any suitable lithium salt that is commonly used (utilized) for lithium batteries. Examples of the lithium salt for the non-aqueous electrolyte are $LiCl$, $LiBr$, $LiI$, $LiClO_4$, $LiB_{10}Cl_{10}$, $LiPF_6$, $CF_3SO_3Li$, $CH_3SO_3Li$, $C_4F_3SO_3Li$, $(CF_3SO_2)_2NLi$, $LiN(C_xF_{2x+1}SO_2)(C_yF_{2+y}SO_2)$ (where x and y are natural numbers), $CF_3CO_2Li$, $LiAsF_6$, $LiSbF_6$, $LiAlCl_4$, $LiAlF_4$, lithium chloro borate, lower aliphatic carboxylic acid lithium, lithium tetraphenylborate, lithium imide, and a combination thereof.

The lithium salt may be used (utilized) in a concentration from about 0.1 M to about 2.0 M in the electrolyte to improve the performance (e.g., practical performance) of the lithium battery. In one embodiment, when the concentration of the lithium salt is within this range, the electrolyte has appropriate conductivity and appropriate viscosity for improved performance, and may improve the mobility of lithium ions.

In some embodiments, the electrolyte for a lithium battery may further include an additional additive to facilitate the formation of a stable solid electrolyte interphase (SEI) or a thin film on a surface of an electrode to provide improved cycle characteristics.

Examples of the additional additive are vinylene carbonate (VC), propane sulfone (PS), succinonitrile (SN), $LiBF_4$, a silane compound having a functional group able to form a siloxane bond (e.g., acryl, amino, epoxy, methoxy, ethoxy, or vinyl), and a silazane compound (such as hexamethyldisilazane). These additional additives may be used (utilized) alone or in a combination of at least two thereof.

An amount of the additional additive may be from about 0.01 wt % to about 10 wt % based on a total weight of the non-aqueous organic solvent. For example, the amount of the additional additive may be from 0.05 wt % to about 10 wt %, in some embodiments, from about 0.1 wt % to about 5 wt %, and in some other embodiments, from about 0.5 wt % to about 4 wt %, based on the total weight of the non-aqueous organic solvent. However, the amount of the additional additive is not particularly limited unless the additive significantly hinders improvement in capacity retention rate of a lithium battery including the electrolyte.

The electrolyte may be applied to a lithium battery that is operable at a high voltage of at least 4.3 V, so as to improve the cell performance and stability. For example, the electrolyte may be applied to a high-voltage battery that is operable at a voltage of about 4.3 V to about 4.6 V.

According to another embodiment, a lithium battery may include a cathode, an anode, and the electrolyte disposed between the cathode and the anode. The lithium battery may be manufactured using (utilizing) a suitable method known in the art.

FIG. 1 is a schematic cross-sectional view illustrating a representative structure of a lithium battery 30 according to an example embodiment.

Referring to FIG. 1, the lithium battery 30 includes a cathode 23, an anode 22, and a separator 24 disposed between the cathode 23 and the anode 22. The cathode 23, the anode 22, and the separator 24 may be wound or fold to be accommodated in a battery case 25. Then, the battery case 25 is filled with an electrolyte and sealed by a sealing member 26, thereby completing the manufacture of the lithium battery 30. The battery case 25 may be a cylindrical kind, a rectangular kind, or a thin-film kind. For example, the lithium battery 30 may be a lithium ion battery.

The cathode 23 includes a cathode current collector, and a cathode active material layer disposed on the cathode current collector.

The cathode current collector may have a thickness of about 3 μm to about 500 μm. The cathode current collector is not particularly limited, and may be any suitable material so long as it has a suitable conductivity without causing chemical changes in the fabricated battery. Examples of the cathode current collector include copper, stainless steel, aluminum, nickel, titanium, sintered carbon, copper or stainless steel that is surface-treated with carbon, nickel, titanium and/or silver, and aluminum-cadmium alloys. In addition, the cathode current collector may be processed to have fine irregularities on surfaces thereof so as to enhance adhesive strength of the cathode current collector to the cathode active material, and may be used (utilized) in any of various suitable forms including films, sheets, foils, nets, porous structures, foams, and non-woven fabrics.

The cathode active material layer may include a cathode active material, a binder, and optionally a conducting agent.

Any suitable lithium-containing metal oxide that is commonly used (utilized) in the art may be used (utilized) as the cathode active material. The common cathode active material may be at least one of a composite oxide of lithium with a metal selected from cobalt (Co), manganese (Mn), nickel (Ni), and a combination thereof. For example, the common cathode active material may be at least one of compounds represented by the following formula: $Li_aA_{1-b}L_bD_2$ (where $0.90 \leq a \leq 1$ and $0 \leq b \leq 0.5$); $Li_aE_{1-b}L_bO_{2-c}D_c$ (where $0.90 \leq a \leq 1$, $0 \leq b \leq 0.5$, and $0 \leq c \leq 0.05$); $LiE_{2-b}L_bO_{4-c}D_c$ (where $0 \leq b \leq 0.5$ and $0 \leq c \leq 0.05$); $Li_aNi_{1-b-c}Co_bL_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bL_cO_{2-\alpha}M_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bL_cO_{2-\alpha}M_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bL_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bL_cO_{2-\alpha}M_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bL_cO_{2-\alpha}M_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be selected from Ni, Co, Mn, and combinations thereof; L may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; M may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; T may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof. For example, the cathode active material may be $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0 \leq x \leq 0.5$ and $0 \leq y \leq 0.5$), or $FePO_4$.

In some embodiments, the cathode active material may have a coating layer on a surface thereof. Alternatively, a mixture of the compound listed above and a compound having a coating layer may be used (utilized) as the cathode active material. The coating layer may include a compound of a coating element selected from oxide, hydroxide, oxyhydroxide, oxycarbonate, and hydroxycarbonate. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using (utilizing) any suitable method (e.g., a spray coating method or a dipping method) that does not adversely affect the physical properties of the cathode active material when a compound of the coating element is used (utilized), and that is known to one of ordinary skill in the art. Thus, a detailed description thereof will not be provided herein.

The binder may bind (e.g., strongly bind) the positive cathode active material particles together and to a current collector. Examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon, but are not limited thereto.

The conducting agent may be used (utilized) to provide conductivity to the electrodes. Any suitable electron conducting material that does not induce chemical change in batteries may be used (utilized). Examples of the conducting agent are natural graphite, artificial graphite, carbon black, acetylene black, ketjen black, carbon fibers, and metal-based materials (such as copper (Cu), nickel (Ni), aluminum (Al), silver (Ag), or the like) in powder or fiber form. The conducting agent may include a single conductive material (such as a polyphenylene derivative) or a combination of at least two conductive materials.

The anode 22 may include an anode current collector and an anode active material layer disposed on the anode current collector.

The anode current collector may have, for example, a thickness of about 3 μm to about 500 μm. The anode current collector is not particularly limited, and may be any suitable materials so long as it has a suitable conductivity without causing chemical changes in the fabricated battery. Examples of the anode current collector are copper, stainless steel, aluminum, nickel, titanium, sintered carbon, copper or stainless steel that is surface-treated with carbon, nickel, titanium and/or silver, and aluminum-cadmium alloys. In addition, the anode current collector may be processed to have fine irregularities on surfaces thereof so as to enhance the adhesive strength of the anode current collector to the anode active material, and may be used (utilized) in any of various suitable forms including films, sheets, foils, nets, porous structures, foams, and non-woven fabrics.

The anode active layer may include an anode active material, a binder, and optionally a conducting agent.

The anode active material is not particularly limited, and may be selected from any suitable anode active material used (utilized) in the art. Examples of the anode active material are lithium metal, a lithium metal alloy, a transition metal oxide, a material that allows doping or undoping of lithium, and a material that allows reversible intercalation and deintercalation of lithium ions, which may be used (utilized) as a mixture or in combination of at least two thereof.

The lithium metal alloy may be an alloy of lithium with a metal selected from sodium (Na), potassium (K), rubidium (Rb), cesium (Cs), francium (Fr), beryllium (Be), magnesium (Mg), calcium (Ca), strontium (Sr), silicon (Si), stibium (antimony, Sb), lead (Pb), indium (In), zinc (Zn), barium (Ba), radium (Ra), germanium (Ge), aluminum (Al), and tin (Sn).

Non-limiting examples of the transition metal oxide are a tungsten oxide, a molybdenum oxide, a titanium oxide, a lithium titanium oxide, a vanadium oxide, and a lithium vanadium oxide.

Examples of the material that allows doping or undoping of lithium are Si, Sn, Al, Ge, Pb, Bi, Sb, $SiO_x$ (0<x<2), a Si—Y alloy (wherein Y is an alkali metal, a alkali earth metal, a Group 11 element, a Group 12 element, a Group 13 element, a Group 14 element, a Group 15 element, a Group 16 element, a transition metal, a rare earth element, or a combination thereof except for Si), $SnO_x$ (0<x<2), and a Sn—Y alloy (wherein Y is an alkali metal, a alkali earth metal, a Group 11 element, a Group 12 element, a Group 13 element, a Group 14 element, a Group 15 element, a Group 16 element, a transition metal, a rare earth element, or a combination thereof except for Sn). For example, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), stibium (antimony, Sb), bismuth (Bi), sulfur (S), selenium (Se), tellurium (Te), polonium (Po), or combinations thereof.

The material that allows reversible intercalation and deintercalation of lithium ions may be any suitable carbonaceous anode active material that is commonly used (utilized) in a lithium battery. Examples of such carbonaceous materials are crystalline carbon, amorphous carbon, and mixtures thereof. Non-limiting examples of the crystalline carbon are natural graphite, artificial graphite, expanded graphite, graphene, fullerene soot, carbon nanotubes, and carbon fiber. Non-limiting examples of the amorphous carbon are soft carbon (carbon sintered at low temperatures), hard carbon, meso-phase pitch carbides, and sintered corks.

The carbonaceous anode active material may be, for example, in spherical, planar, fibrous, tubular, or powder form.

The binder may bind (e.g., strongly bind) anode active material particles together and to the anode current collector. Non-limiting examples of the binder are polyvinyl alcohol, carboxymethyl cellulose, hydroxypropyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon, but are not limited thereto.

The conducting agent is used (utilized) to provide conductivity to the anode. Any suitable electron conducting material that does not induce chemical change in batteries may be used (utilized). Examples of the conducting agent are carbonaceous materials (such as natural graphite, artificial graphite, carbon black, acetylene black, ketjen black, carbon fibers, or the like); metal-based materials (such as copper (Cu), nickel (Ni), aluminum (Al), silver (Ag), or the like) in powder or fiber form; and conductive materials, including conductive polymers (such as a polyphenylene derivative), and mixtures thereof.

The cathode 23 and the anode 22 may be each manufactured by mixing an active material, a conducting agent, and a binder in a solvent to prepare an active material composition, and coating the active material composition on a current collector.

Any suitable method of manufacturing such electrodes which is known to one of ordinary skill in the art may be used (utilized). Thus, a detailed description thereof will not be provided herein. Here, examples of the solvent are N-methypyrrolidone (NMP), acetone, and water, but the solvent is not limited thereto.

The separator 24 may be disposed between the cathode 23 and the anode 22, and the separator 24 may be any suitable separator that is commonly used (utilized) for lithium batteries. For example, the separator 24 may have low resistance to migration of ions in an electrolyte and have electrolyte-retaining ability. The separator 24 may be a single layer or a multi-layer. Examples of the separator 24 are glass fiber, polyester, Teflon, polyethylene, polypropylene, polytetrafluoroethylene (PTFE), and a combination thereof, each of which may be a nonwoven fabric or a woven fabric. The separator 24 may have a pore diameter of about 0.01 μm to about 10 μm and a thickness of about 3 μm to about 100 μm.

As described in the above embodiments, the electrolyte for lithium batteries may include lithium nitrate ($LiNO_3$) in an amount from about 0.1 wt % to about 1 wt % based on a total weight of the non-aqueous organic solvent. The electrolyte may be injected between the cathode 23 and the anode 22 with the separator 24 therebetween.

The suitable use (usage) of the lithium battery may include applications in electric vehicles where the lithium battery should be operable at high voltages, high outputs, and high temperatures, in addition to the application in mobile phones or portable computers. The lithium battery may be also configured with the existing internal combustion engine, fuel cells, and/or super capacitors, for the use (usage) in hybrid vehicles. Thus, the lithium battery may be applied to electric bicycles, power tools, or the like, by operation at high outputs, high voltages, and high temperatures.

One or more embodiments will now be described in more detail with reference to the following examples. However, these examples are not intended to limit the scope of the one or more embodiments.

Evaluation of Cell Characteristics According to Mixing Ratio of Additive to Electrolyte Example 1a A mixed solvent of ethylene carbonate (EC), propylene carbonate (PC), and diethyl carbonate (DEC) mixed in a volume ratio of about 20:20:60 was added with $LiPF_6$ until the concentration of $LiPF_6$ reached 1.3 M. Then, as additives, 1.5 wt % of lithium difluoro(oxalato)borate (LiFOB) of Formula 1a below and 3 wt % of tris(trimethylsylyl) phosphate (TMSPa) of Formula 2a below were added to the mixed solvent, thereby preparing an electrolyte for a lithium battery.

Formula 1a

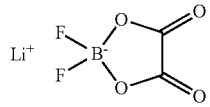

Formula 2a

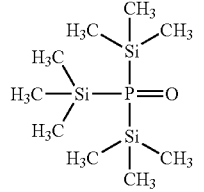

The electrolyte was used (utilized) to prepare an evaluation cell as in the following manner.

$LiCoO_2$ powder as a cathode active material and a carbon conducting agent (Super-P; Timcal Ltd.) were mixed in a weight ratio of 90:5, and then, a polyvinylidene fluoride (PVDF) binder solution was added to prepare a slurry in which a weight ratio of the active material:carbon conducting agent:binder was 90:5:5. The active material slurry was coated on an aluminum foil having a thickness of 15 μm. The aluminum foil was dried, and roll-pressed to prepare a cathode. Here, the cathode plate had a density (e.g., a mixture density) of 5.1 g/cc.

In order to increase the viscosity of a mixture of graphite powder as an anode active material and a PVDF binder mixed at a weight ratio of 1:1, an N-methylpyrrolidinone solid was added thereto until the amount thereof reached 60 wt %, thereby preparing an anode active material slurry. The slurry was coated on an aluminum foil having a thickness of 10 μm. The aluminum foil was dried, and then, roll-pressed to prepare an anode.

Then the cathode, the anode, and a polyethylene separator having a thickness of 20 μm (STAR20, Asahi) were used (utilized), in addition to the electrolyte, to manufacture a 18650 type (kind) full cell.

Example 1b

A full cell was manufactured in the same manner as in Example 1a, except that 3 wt % of LiFOB and 1.5 wt % of TMSPa were used (utilized) as the additive.

Example 1c

A full cell was manufactured in the same manner as in Example 1a, except that 2 wt % of LiFOB and 2 wt % of TMSPa were used (utilized) as the additive.

Comparative Example 1a

A full cell was manufactured in the same manner as in Example 1a, except that 3 wt % of LiFOB and 3 wt % of TMSPa were used (utilized) as the additive.

Comparative Example 1b

A full cell was manufactured in the same manner as in Example 1a, except that only 4 wt % of TMSPa was used (utilized) as the additive.

Comparative Example 1c

A full cell was manufactured in the same manner as in Example 1a, except that only 4 wt % of LiFOB was used (utilized) as the additive.

Comparative Example 1d

A full cell was manufactured in the same manner as in Example 1a, except that only 4 wt % of LiFOB was used (utilized) as the additive.

Evaluation Example 1a

Evaluation of Lifetime (Lifespan) Characteristics

The full cells prepared according to Examples 1a-1c and Comparative Examples 1a-1d were each subjected to the evaluation of lifetime (lifespan) characteristics thereof by performing one-time charge/discharge at 0.1 C/0.1 C, one-time charge/discharge at 0.2 C/0.2 C, and charge/discharge at 1.0 C/1.0 C repeatedly over 140 times. Such charge/discharge test was performed at a temperature of 45° C. under conditions of CC-CV with 0.01 C cut-off and CV with 4.40V cut-off. Here, the lifetime (lifespan) characteristics were evaluated by calculating capacity retention ratio defined by Equation 1 below.

Capacity retention ratio[%]=[$n^{th}$ cycle discharge capacity/$1^{st}$ cycle discharge capacity]×100   Equation 1

Figure 2:
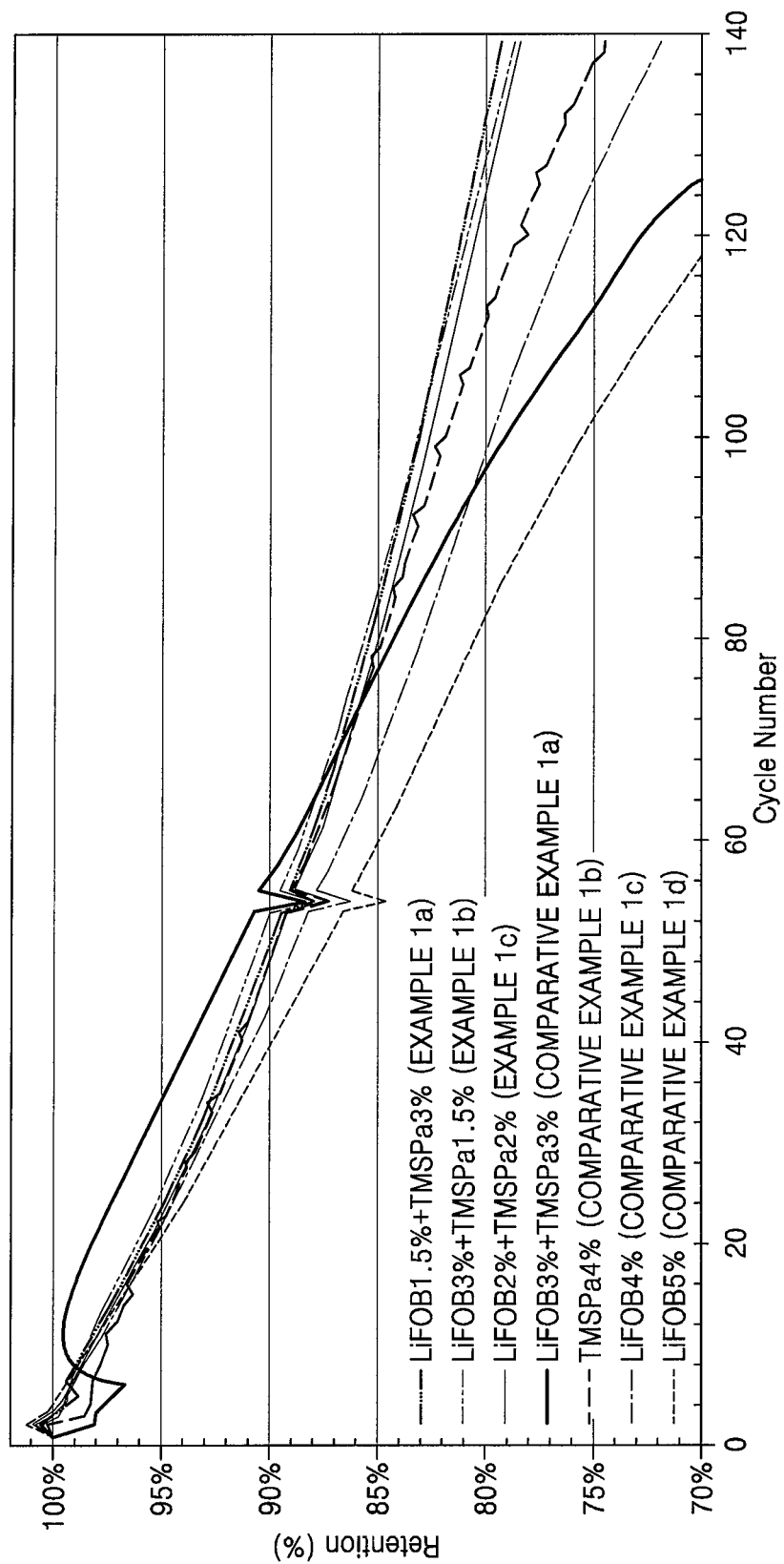
FIG. 2 is a graph of retention versus cycle number showing capacity retention rates of lithium batteries prepared according to Examples 1A-1C and Comparative Examples 1A-1D.

The capacity retention ratios of the full cells of Examples 1a-1c and Comparative Examples 1a-1d are shown in FIG. 2.

Referring to FIG. 2, it was confirmed that the capacity retention ratios of the full cells have improved lifetime (lifespan) characteristics when a total amount of LiFOB and TMSPa mixed herein did not exceed 6 wt %. Alternatively, it was confirmed that an excess total amount of LiFOB and TMSPa mixed herein had adversely affected the lifetime (lifespan) characteristics of the full cells. Even if TMSPa or LiFOB was used (utilized) alone, an excessive amount thereof was found to adversely affect the lifetime (lifespan) characteristics of the full cells.

Difference Comparison in Cases of Mixing TMSPa with LiFOB and LiBOB

Example 2

A mixed solvent of (EC), propylene carbonate (PC), and diethyl carbonate (DEC) mixed in a volume ratio of about 20:20:60 was added with LiPF$_6$ until the concentration of LiPF$_6$ reached 1.3 M. Then, as additives, 1.5 wt % of LiFOB and 3 wt % of TMSPa were added to the mixed solvent, thereby preparing an electrolyte for a lithium battery.

A full cell was manufactured in the same manner as in Example 1a by using (utilizing) the electrolyte.

Comparative Example 2a

A full cell was manufactured in the same manner as in Example 2, except that 1.5 wt % of lithium bis(oxalato) borate (LiBOB) of Formula 3 below and 3 wt % of TMSPa were used (utilized) as the additive.

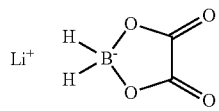

Formula 3

Comparative Example 2b

A full cell was manufactured in the same manner as in Example 2, except that no additive has been used (utilized).

Evaluation Example 2

Evaluation of Lifetime (Lifespan) Characteristics

The full cells prepared according to Example 2 and Comparative Examples 2a-2b were each subjected to the evaluation of lifetime (lifespan) characteristics thereof by performing one-time charge/discharge at 0.1 C/0.1 C, one-time charge/discharge at 0.2 C/0.2 C, and charge/discharge at 1.0 C/1.0 C repeatedly over 70 times. Such charge/discharge test was performed at a temperature of 45° C. under conditions of CC-CV with 0.01 C cut-off and CV with 4.40V cut-off.

Figure 3:
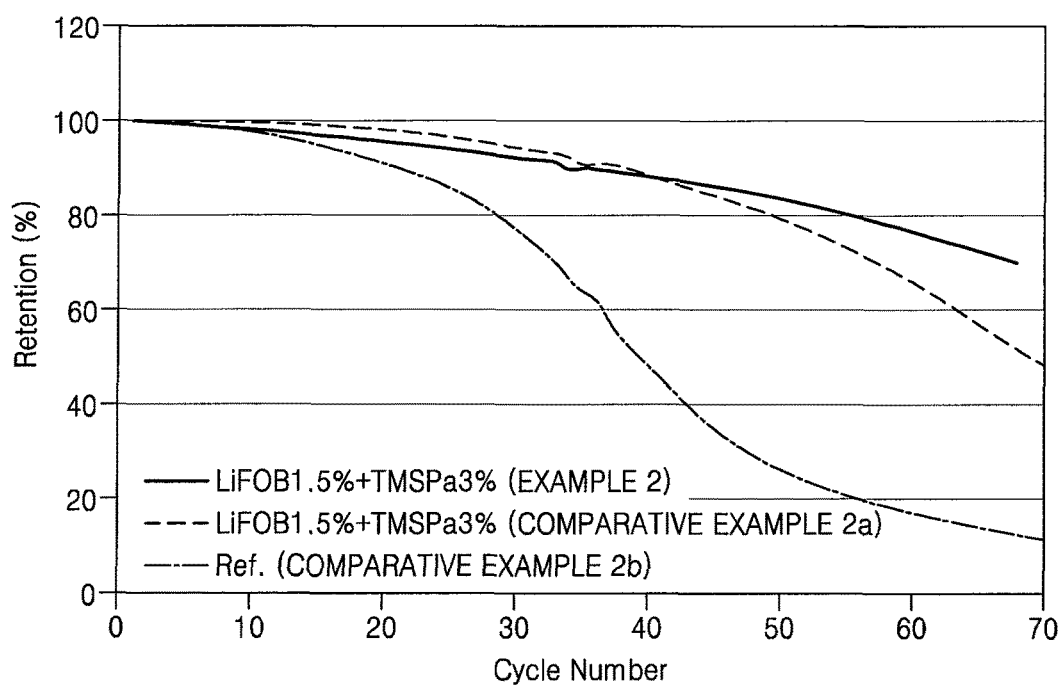
FIG. 3 is a graph of retention versus cycle number showing capacity retention rates of lithium batteries prepared according to Example 2 and Comparative Examples 2A-2B.

The capacity retention ratios of the full cells of Example 2 and Comparative Examples 2a-2b are shown in FIG. 3.

Referring to FIG. 3, it was confirmed that LiFOB has provided better lifetime (lifespan) characteristics than LiBOB. LiFOB has a fluorine (F) component that is not included in LiBOB, and in this regard, LiFOB was able to form a strong thin film on the cathode and the anode for good lifetime (lifespan) of the batteries.

Evaluation Example 3

Analysis of Cathode Thin Film Component

Following the first charge/discharge, the full cells of Example 2 and Comparative Examples 2a-2b were each disassembled in a glove box to recover the cathode, which was then cleaned with dimethyl carbonate to remove the electrolyte and the lithium salt therefrom, and dried. A surface material was taken from each cathode as a sample, which was then analyzed using (utilizing) an X-ray photoelectron spectroscope (XPS) (Sigma Probe, Thermo, UK) under vacuum conditions. The results are shown in FIGS. 4A and 4B.

Figure 4A:
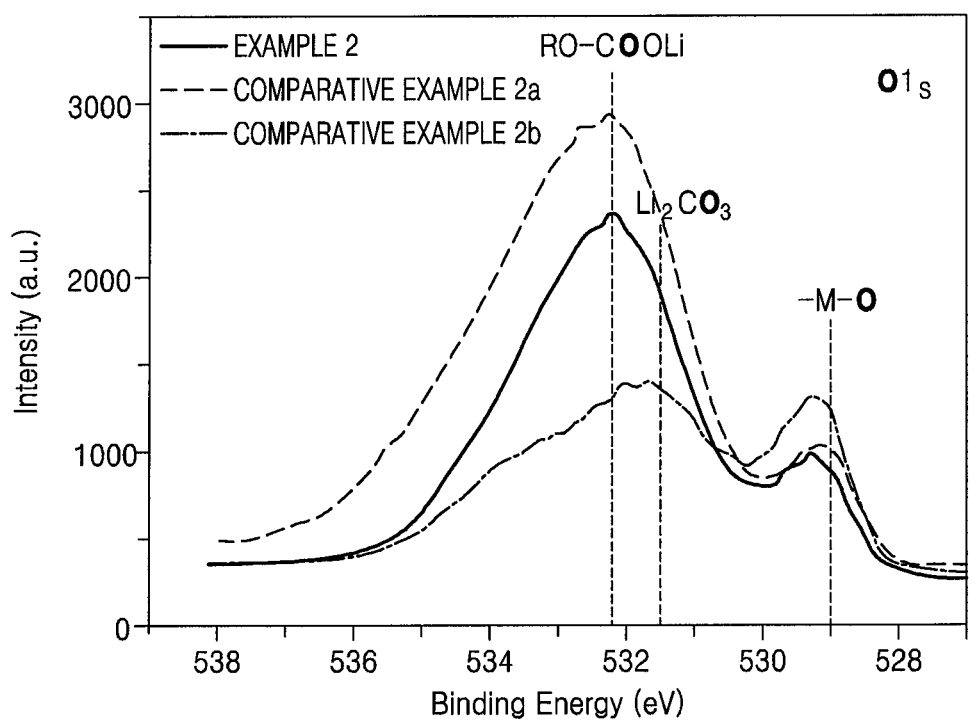
Figure 4B:
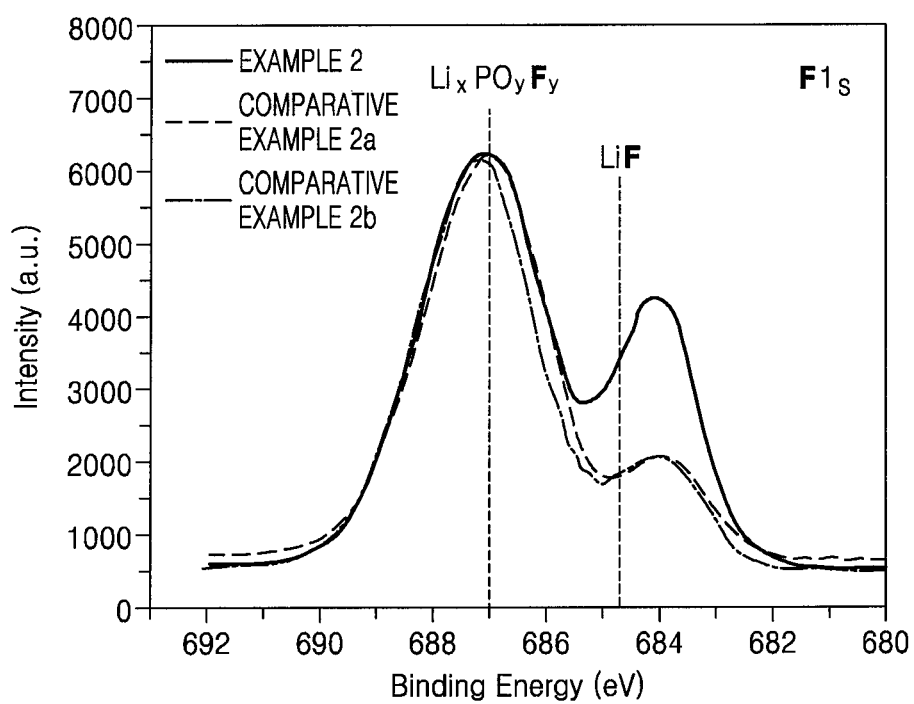

FIG. 4A is the XPS result showing O 1 s peak, and FIG. 4B is the XPS result showing F 1 s peak.

Referring to FIGS. 4A and 4B, the surface materials sampled from the surface of the cathode of the full cells of Example 2 and Comparative Example 2a were found to have larger O 1 s peaks in comparison to that of the surface material sampled from the surface of the cathode of Comparative Example 2b, and in more detail, the surface material of Comparative Example 2b prepared by using (utilizing) LiBOB with more oxalate groups was found to have larger O 1 s peak compared to the other surface materials.

Meanwhile, only the surface material of Example 2 prepared by using (utilizing) LiFOB was found to have large F 1 s peaks. In this regard, it was found that the full cell of Example 2 having the structure of LiFOB including the F component has formed a LiF thin film on the cathode as compared to those of Comparative Examples 2a-2b.

Therefore, in regard to protection of the cathode, it was found that LiFOB was capable of forming not only an oxalate group-containing organic film, but also a LiF-containing inorganic film, and that TMSPa was able to suppress the salt decomposition. Thus, a combination of LiFOB and TMSPa was found to show the most excellent cell performance.

Difference Comparison Between Various Combinations and Addition of TMSB

Example 3a

A mixed solvent of (EC), propylene carbonate (PC), and diethyl carbonate (DEC) mixed in a volume ratio of about 20:20:60 was added with LiPF$_6$ until the concentration of LiPF$_6$ reached 1.3 M. Then, as additives, 1.5 wt % of LiFOB and 3 wt % of TMSPa were added to the mixed solvent, thereby preparing an electrolyte for a lithium battery.

A full cell was manufactured in the same manner as in Example 1a by using (utilizing) the electrolyte.

Example 3b

A full cell was manufactured in the same manner as in Example 3a, except that 1.5 wt % of LiFOB and 3 wt % of tris(trimethylsylyl)phosphate (TMSPi) of Formula 2b below were used (utilized) as the additive.

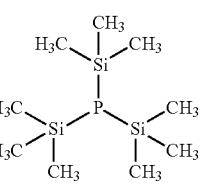

[Formula 2b]

Example 3c

A full cell was manufactured in the same manner as in Example 3a, except that 1.5 wt % of lithium tetrafluoro (oxalato)phosphate (LiTFOP) of Formula 1b below and 3 wt % of TMSPa were used (utilized) as the additive.

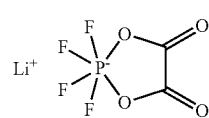

Formula 1b

Comparative Example 3a

A full cell was manufactured in the same manner as in Example 3a, except that 1.5 wt % of lithium bis(oxalato) borate (LiBOB) and 3 wt % of TMSPa were used (utilized) as the additive.

Comparative Example 2b

A full cell was manufactured in the same manner as in Example 3a, except that no additive has been used (utilized).

Evaluation Example 4

Evaluation of Lifetime (Lifespan) Characteristics

The full cells prepared according to Examples 3a-3c and Comparative Examples 3a-3b were each subjected to the evaluation of lifetime (lifespan) characteristics thereof by performing one-time charge/discharge at 0.1 C/0.1 C, one-time charge/discharge at 0.2 C/0.2 C, and charge/discharge at 1.0 C/1.0 C repeatedly over 50 times. Such charge/discharge test was performed at a temperature of 45° C. under conditions of CC-CV with 0.01 C cut-off and CV with 4.40V cut-off.

Figure 5:
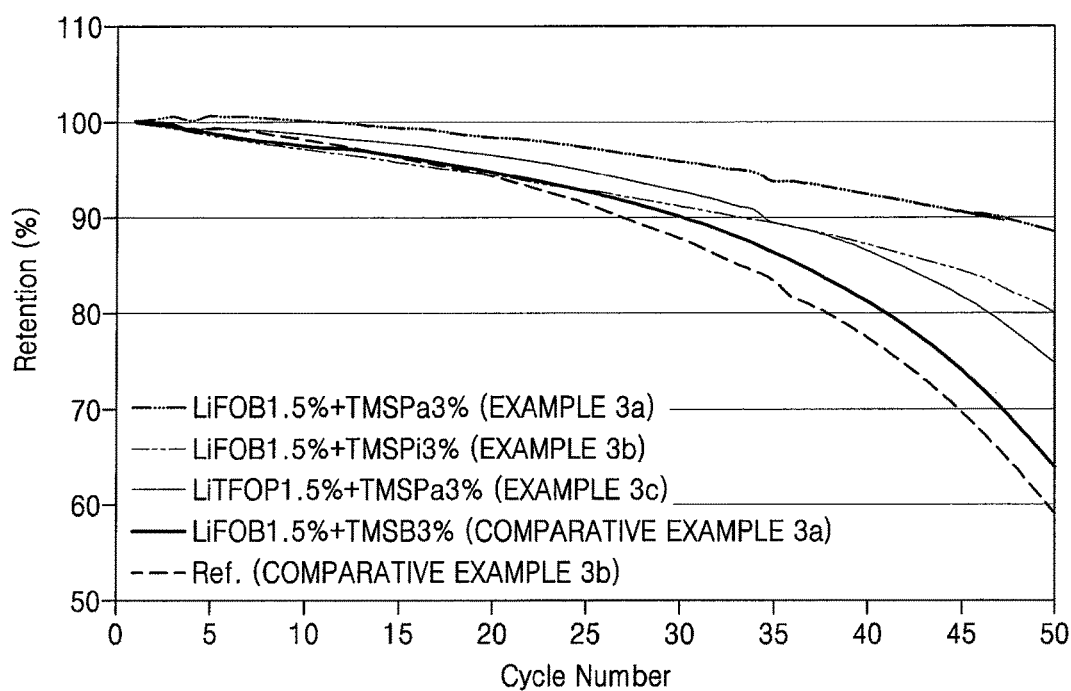
FIG. 5 is a graph of retention versus cycle number showing capacity retention rates of lithium batteries prepared according to Examples 3A-3C and Comparative Examples 3A-3B.

The capacity retention ratios of the full cells of Examples 3a-3c and Comparative Examples 3a-3b are shown in FIG. 5.

Referring to FIG. 5, it was confirmed that the case using (utilizing) the combination of the compounds, including the F component and the oxalate group at the same time, and tris(trimethylsilyl)phosphate or tris(trimethylsilyl)phosphite, had improved lifetime (lifespan) characteristics than those not using (utilizing) any additives. In addition, despite of the presence of the tris(trimethylsilyl) group, the phosphate or phosphite compound was found to have better (e.g., more significantly excellent) lifetime (lifespan) characteristics than those of the borate compound.

As described above, according to the one or more of the above example embodiments, an electrolyte for a lithium battery may be used (utilized) to help improve cycle characteristics of the lithium battery that is operable at high voltages.

It should be understood that the example embodiments described therein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims, and equivalents thereof.

What is claimed is:

1. An electrolyte for a lithium battery, comprising:
a non-aqueous organic solvent;
a first compound represented by Formula 1; and
a second compound represented by Formula 2:

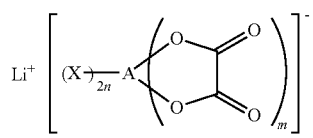

Formula 1 wherein, in Formula 1,
A is boron (B) or phosphorus (P);
X is a halogen atom;
in the case that A is boron (B), n equals 1 and m equals 1;
in the case that A is phosphorus (P), n equals 1 and m equals 2; or n equals 2 and m equals 1;

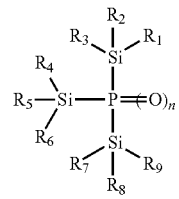

Formula 2 wherein, in Formula 2,
$R_1$ to $R_9$ are each independently selected from a hydrogen, a deuterium, a halogen atom, a hydroxyl group (—OH), a cyano group, a nitro group, an amino group, an amidino group, a hydrazine group, a hydrazone group, a carboxylic acid group or a salt thereof, a sulfonic acid group or a salt thereof, a phosphoric acid group or a salt thereof, a thio group (—SH), —C(=O)—H, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_3$-$C_{10}$ cycloalkyl group, a substituted or unsubstituted $C_3$-$C_{10}$ heterocycloalkyl group, a substituted or unsubstituted $C_2$-$C_{10}$ cycloalkenyl group, a substituted or unsubstituted $C_2$-$C_{10}$ heterocycloalkenyl group, a substituted or unsubstituted $C_6$-$C_{60}$ aryl group, and a substituted or unsubstituted $C_2$-$C_{60}$ heteroaryl group; and
n is 0 or 1.

2. The electrolyte of claim 1, wherein X in Formula 1 is a fluorine atom.

3. The electrolyte of claim 1, wherein the first compound includes at least one group represented by Formulae 1a to 1c:

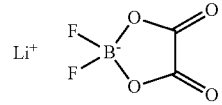

Formula 1a

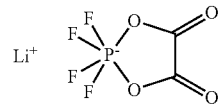

Formula 1b

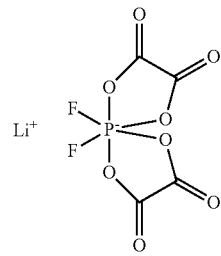

Formula 1c

4. The electrolyte of claim 1, wherein in Formula 2, at least one hydrogen atom of the alkyl group, the alkenyl group, and/or the alkynyl group are each independently substituted with a halogen atom, a $C_1$-$C_{20}$ alkyl group substituted with a halogen atom, a $C_1$-$C_{20}$ alkoxy group, a $C_2$-$C_{20}$ alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_6$-$C_{20}$ heteroaryloxy group, a $C_6$-$C_{20}$ heteroaryloxyalkyl group, and/or a $C_6$-$C_{20}$ heteroarylalkyl group.

5. The electrolyte of claim 1, wherein $R_1$ to $R_9$ in Formula 2 are each independently a substituted or unsubstituted $C_1$ to $C_{10}$ alkyl group.

6. The electrolyte of claim 1, wherein the second compound includes at least one group represented by Formulae 2a and 2b:

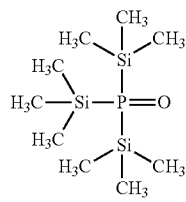

Formula 2a

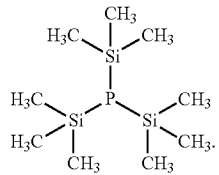

Formula 2b

7. The electrolyte of claim 1, wherein the first compound is represented by Formula 1a, and the second compound is represented by Formula 2a:

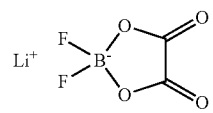

Formula 1a

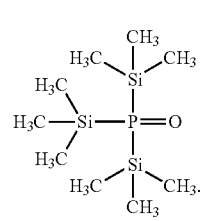

Formula 2a

8. The electrolyte of claim 1, wherein an amount of the first compound is not less than 0.1 wt % and not greater than 4 wt %, an amount of the second compound is not less than 0.1 wt % and not greater than 4 wt %, and a total amount of the first compound and the second compound is less than 6 wt %, based on a total weight of the electrolyte.

9. The electrolyte of claim 1, further comprising a lithium salt.

10. A lithium battery, comprising:

a cathode;

an anode; and the electrolyte of claim 1 between the cathode and the anode.

11. The lithium battery of claim 10, wherein the lithium battery operates at a voltage range from about 4.3 V to about 4.6 V.

* * * * *